US00RE39688E

(19) United States
(12) Reissued Patent
LaRiviere

(10) Patent Number: US RE39,688 E
(45) Date of Reissued Patent: Jun. 12, 2007

(54) TANGENTIAL DISCHARGE DISK REFINER

(75) Inventor: Christopher J. LaRiviere, Cornish Flat, NH (US)

(73) Assignee: GL&V Management Hungary Kft, Budapest (HU)

(21) Appl. No.: 10/422,476

(22) Filed: Apr. 24, 2003

Related U.S. Patent Documents

Reissue of:
(64) Patent No.: 6,053,440
Issued: Apr. 25, 2000
Appl. No.: 09/260,458
Filed: Mar. 2, 1999

(51) Int. Cl.
*B02C 7/02* (2006.01)

(52) U.S. Cl. ..... 241/46.01; 241/261.2; 241/261.3

(58) Field of Classification Search ..... 241/259.1, 241/261.2, 261.3, 46.01, 46.17, 82, 296, 241/297, 298
See application file for complete search history.

(56) References Cited

U.S. PATENT DOCUMENTS 3,831,868 A 8/1974 Kahmann
3,984,057 A * 10/1976 Pilao ..... 241/248
4,005,827 A * 2/1977 Frair et al. ..... 241/261.3
4,036,443 A * 7/1977 Saltarelli ..... 241/297
4,081,147 A * 3/1978 Seifert et al. ..... 241/261.3
4,402,463 A * 9/1983 Kahmann et al.
4,589,598 A * 5/1986 Ellery, Sr. ..... 241/37
4,625,926 A * 12/1986 Kirchner ..... 241/261.2
4,783,014 A * 11/1988 Fredriksson et al. ..... 241/261.2
5,011,091 A * 4/1991 Kopecky ..... 241/259.1
5,067,660 A * 11/1991 Reinhall ..... 241/37
5,203,514 A * 4/1993 Mokvist et al. ..... 241/81
5,445,328 A * 8/1995 Musselman ..... 241/37

* cited by examiner

*Primary Examiner*—Mark Rosenbaum
(74) *Attorney, Agent, or Firm*—James Earl Lowe, Jr.

(57) ABSTRACT

A papermaking refiner has two stationary disks mounted to the support structure of a fixed housing. A rotating disk is mounted on a shaft which extends through the housing. The support structure allows stock to circulate on both sides of the disk support structure, thus balancing fluid pressures on both sides of the fixed disk and preventing thermal gradients for reduced deflection of the disks. The incoming stock is centrifugally accelerated in a shroud which separates and traps tramp metal or the like before the stock passes to the refiner disks. The shroud has passageways which allow the rotating fluid to enter a reservoir which surrounds the drive shaft and feeds the gaps between the rotor and the stationary plates.

11 Claims, 3 Drawing Sheets

TANGENTIAL DISCHARGE DISK REFINER

Matter enclosed in heavy brackets [ ] appears in the original patent but forms no part of this reissue specification; matter printed in italics indicates the additions made by reissue.

CROSS REFERENCES TO RELATED APPLICATIONS

STATEMENT AS TO RIGHTS TO INVENTION MADE UNDER FEDERALLY SPONSORED RESEARCH AND DEVELOPMENT

BACKGROUND OF THE INVENTION

The present invention relates in general to refiners for treating paper pulp fibers to condition the fibers prior to delivery to a papermaking machine and to refiners for handling stock having a consistency of about 3 to about 6 percent fiber by weight.

Disc refiners are used in the papermaking industry to prepare paper pulp fibers for the forming of paper on a papermaking machine.

Paper stock containing three to six percent dry weight fibers is fed between closely opposed rotating discs within the refiner. The refiner discs perform an abrading operation on the paper fibers as they transit radially between the opposed moving and non-moving refiner discs. The purpose of a disc refiner is to abrade the individual wood pulp fibers.

Processing of fibers in a low consistency refiner may be performed on both chemically and mechanically refined pulps and in particular may be used sequentially with a high consistency refiner to further process the fibers after they have been separated in the high consistency disk refiner.

In operation, a low consistency disc refiner is generally considered to exert a type of abrasive action upon individual fibers in the pulp mass so that the outermost layers of the individual cigar-shaped fibers are frayed. This fraying of the fibers, which is considered to increase the freeness of the fibers, facilitates the bonding of the fibers when they are made into paper.

Paper fibers are relatively slender, tube-like structural components made up of a number of concentric layers. Each of these layers (called "lamellae") consists of finer structural components (called "fibrils") which are helically wound and bound to one another to form the cylindrical lamellae. The lamellae are in turn bound to each other, thus forming a composite which, in accordance with the laws of mechanics, has distinct bending and torsional rigidity characteristics. A relatively hard outer sheath (called the "primary wall") encases the lamellae. The primary wall is often partially removed during the pulping process. Raw fibers are relatively stiff and have relatively low surface area when the primary wall is intact, and thus raw fibers exhibit poor bond formation, with the result that paper which is made of raw fibers has limited strength It is generally accepted that it is the purpose of a pulp stock refiner, which is essentially a milling device, to partially remove the primary wall and break the bonds between the fibrils of the outer layers to yield a frayed surface, thereby increasing the surface area of the fiber multi-fold.

Disc refiners typically consist of a pattern of raised bars interspaced with grooves. Paper fibers contained in a water stock are caused to flow between opposed refiner discs or plates which are rotating with respect to each other. As the stock flows radially outwardly across the refiner plates, the fibers are forced to flow over the bars. The milling action is thought to take place between the closely spaced bars on opposed discs.

Disk refiners have proven to be cost effective devices with high throughput which can readily operate over a range of stock flows. Nevertheless, improvements in disk wear life and other means of reducing maintenance remain desirable.

SUMMARY OF THE INVENTION

The disk refiner of this invention improves the overall performance of a twin disk refiner of the type having two stationery disks and a single rotor on which are mounted opposed refiner disks which oppose the stationery disks. As is conventional, one of the stationary disks is fixed and the other is mounted for axial movement towards the other stationery disk. In the past the shaft on which the rotor was mounted was movable axially to position the rotor between the stationery disks as the distance between the stationery disks was adjusted. In the disk refiner of this invention the rotor is mounted for axial movement to a spline. The spline forms part of a drive shaft connected to a drive motor. The spline mounting facilitates hydrodynamic balance of the rotor between the stationary disks.

The disk refiner supports the stationery disks on less rigid structure but is designed to allow stock to circulate on both sides of the disk support structure. This improves alignment between the rotor mounted refiner disks and the stationary refiner desks in two ways: by balancing fluid pressures on both sides of the stationery mounting structures for the refiner disks, and by preventing thermal gradients from causing deflection of these same structures.

In order to prevent damage to the refiner plates due to tramp metal, the incoming stock is centrifugally accelerated in a shroud which separates and traps tramp metal or the like before the stock passes between the stationery and rotating refiner disks. The shroud has passageways which allow the rotating fluid to enter a reservoir which surrounds the drive shaft and feeds the gaps between the rotor and the stationary plates. By pre-rotating the stock before it flows to the rotor, stock is more easily balanced between both sides of the rotor because the rotating stock can pass through openings in the rotor to reach the rotor back side.

It is a feature of the present invention to provide a disk refiner with reduced wear of the refiner plates.

It is another feature of the present invention to provide a double disk refiner with a rotor which is free to position itself between stationery refining plates.

It is a still further feature of the present inventions to provide a double disk refiner which incorporates a means for removing foreign objects before stock is processed by the refiner.

It is a yet further feature of the present invention to provide a lighter weight refiner which supports with less deflection the stationary refiner plates.

It is another further feature of the present invention to provide a double disk refiner with lower maintenance cost.

Further objects, features and advantages of the invention will be apparent from the following detailed description when taken in conjunction with the accompanying drawings.

DESCRIPTION OF THE PREFERRED EMBODIMENTS

Figure 1:
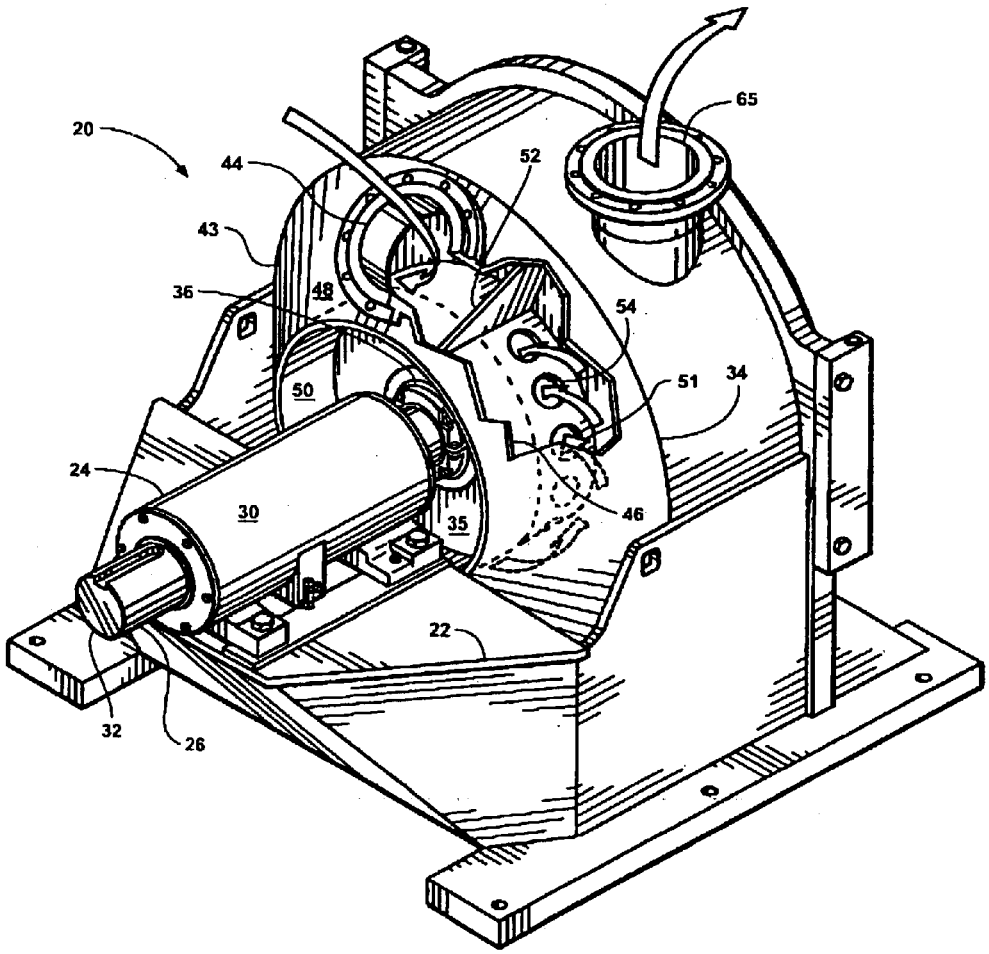
FIG. 1 is a rear isometric view, partly cutaway in section, of the double disk refiner of this invention.
Figure 2:
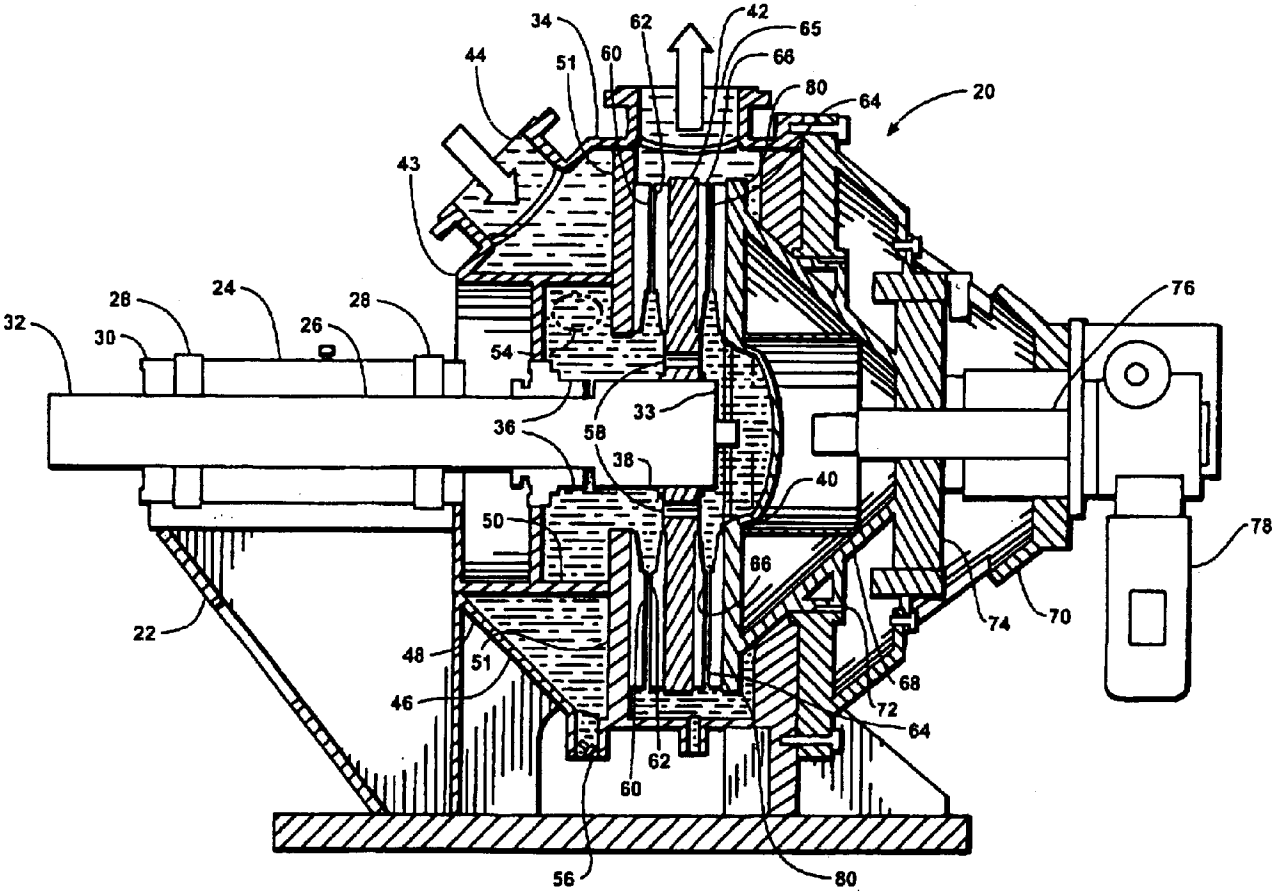
FIG. 2 is a cross-sectional view of the double disk refiner of FIG. 1, taken along section line 2—2.
Figure 3:
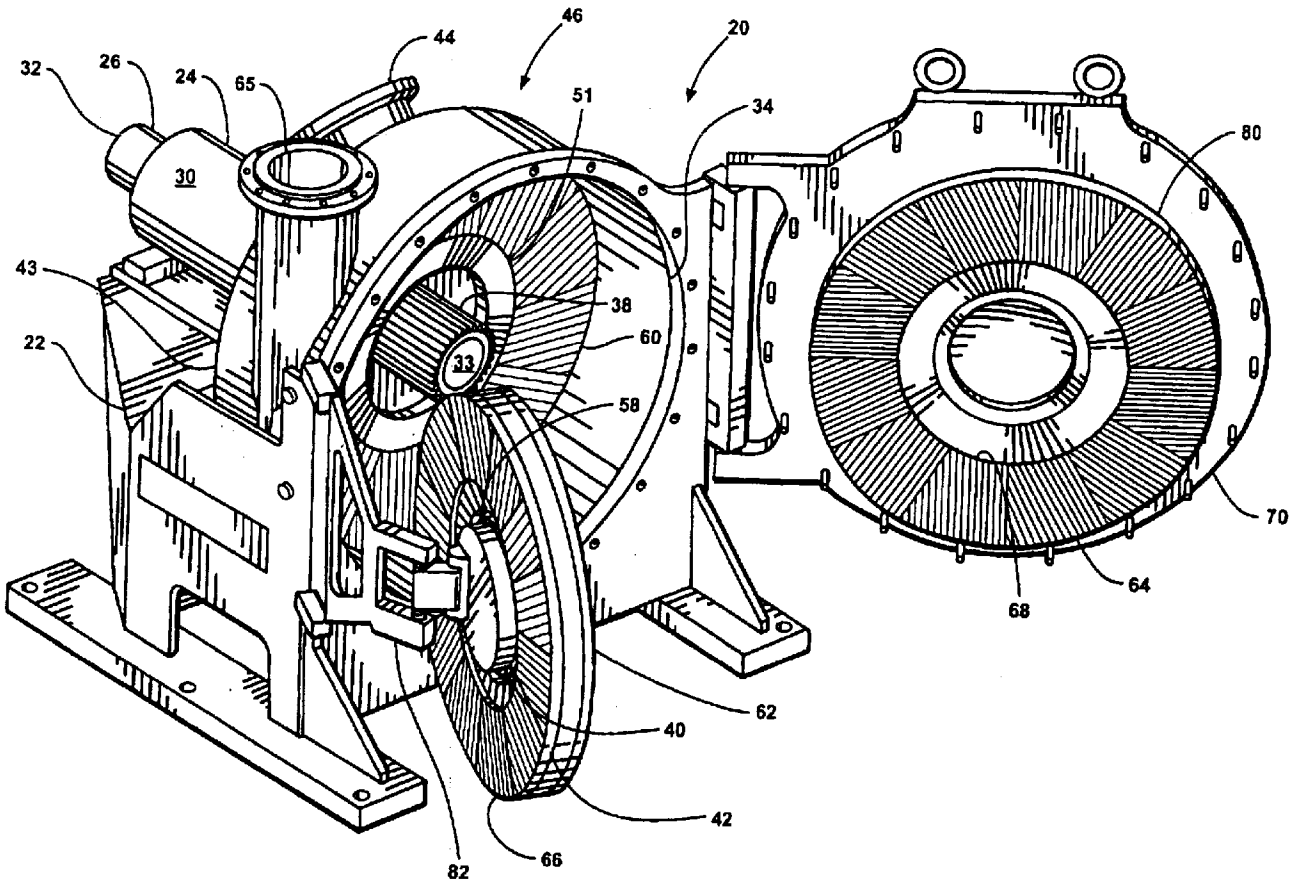
FIG. 3 is a front isometric view of the double disk refiner of FIG. 1 shown open for maintenance.

Referring more particularly to FIGS. 1–3 wherein like numbers refer to similar parts, a double disk refiner 20 is shown in FIGS. 1–3. The refiner 20 has a machine frame 22 on which is mounted a rotating assembly 24 having a shaft 26 mounted by bearings 28 to a shaft case 30. The shaft 26 is connected at a first end 32 to a drive motor (not shown). A second end 33 of the shaft 26 passes into a refiner housing 34 through a circular bulkhead 35 at a removable packing box 36. As shown in FIG. 2, the second shaft end 33 is machined to form a spline 38 to which the hub 40 of a rotor 42 is mounted.

The drive side 43 of the refiner housing 34 has a stock inlet 44 which supplies stock to a shroud 46 defining a triangular cross-section passageway between an outer conical shell 48, an inner cylindrical structure 50, and a drive side stationery plate support structure 51. The inner cylindrical structure 50 surrounds the bulkhead 35. The shroud 46 causes the stock to rotate producing approximately one-half G acceleration directed radially outwardly of the cylindrical structure 50. The triangular passageway terminates at a baffle 52, thus causing the stock to pass through a series of six holes 54 to enter a reservoir formed on the inside of the cylindrical structure 50 surrounding the shaft 26.

The shroud 46 performs several functions. The circular path about which the stock is forced to flow separates tramp metal and other heavy weight junk, throwing it radially outwardly against the other conical shell 48. The radial acceleration, however, is not so great that it causes heavy weight tramp metal or the like to travel upwardly along the conical shell into engagement with the baffle 52. Rather the tramp metal or the like collects near a junk outlet 56 positioned near the lower most portion or bottom of the shroud 46.

The rotary motion of the stock about the cylindrical structure 50 persists as the flow passes through the holes 54 and, in accordance with the conservation of angular momentum, the rotation of the stock increases as it approaches the rotation axis defined by the shaft 26. Viscous drag of the shaft 26 on the stock flow as it moves along the shaft towards the rotor 42 also accelerates the stock so that the stock can flow through the openings 58 in the rotor 42 with less resistance and thus less pressure drop. Thus the presence of the shroud 46 removes tramp metal or the like and improves the uniformity of the stock flow between the drive side, non-moving, stationery plates 60, the drive side rotating plates 62 and the movable stationery plates 64 and the door side rotating plates 66.

The shroud 46 brings stock into engagement with the back side of the stationary plate support structure 51, which forms part of the triangular passageway, thus applying hydraulic support to the support structure 51. This hydraulic support allows the stator's support structure to be constructed of a substantially lighter weight structural section. For example a prior part refiner employing a support structure having a thickness of four and one-half inches has twice the deflection of a support structure 51 having a thickness of forty-seven millimeters (about two inches). The fact that the support structure 51 is essentially completely surrounded by stock results in very little temperature gradient within the support structure with the result that thermal deflection is essentially eliminated. The improved thermal design eliminates environmental temperature and temperature of the stock being processed as variables affecting refiner performance.

In a refiner the action on the fibers as they pass between the plates 62, 66 mounted on the rotor 42 and the stationary plates 60, 64 requires that the plates be closely spaced, typically between two and four thousandths of an inch apart. Maintaining this gap uniformly across the entire refiner plate diameter—which may be fifty-four inches across or more—has in the past resulted in massive support structures to resist deflections caused by pressures between the refiner plates.

The stock is fed to the rotor 42 at a pressure of twenty to ninety psi, and the rotor produces a pumping action, increasing the pressure approximately fifteen to twenty psi, depending on the particular pattern of bars on the refiner plates, as the stock flows between the refiner disks. The portion of the refiner housing 34 which contains the rotor 42 between the stationary plates 60, 64 defines a refining chamber.

After flowing through the refiner plates, in the refining chamber, stock exits the refiner housing 34 through a tangential stock outlet 65. By presenting the stock pressure to both sides of the stationery disk support structure 51, the deflection loads on the support structure 51 are substantially reduced, allowing a lighter weight support structure which has lower deflections under load. A synergistic effect of using lighter weight structural sections is that the wetted parts of the refiner 20 can be constructed of stainless steel, preferably at least type 316L, without a prohibitive cost.

One set of stationery plates 64 is mounted on a sliding head 68. The sliding head 68 is mounted for translation toward and away from the rotor 42. The sliding head 68 is mounted by a bearing ring 72 to a removable door 70 which forms parts of the refiner housing 34. The sliding head 68 is balanced by a counterweight 74 and driven by a screw jack mechanism 76 which employs a variable frequency drive motor 78, similar to the arrangement shown in FIG. 2 of U.S. Pat. No. 4,589,598 to Ellery, Sr., which is incorporated herein by reference.

The rotor 42 is mounted on the spline 38 at the end of the shaft 26. The spline transmits rotary power to the rotor, but is not affixed to the rotor 42. Sufficient play between the rotor hub 40 and the spline 38 is provided so that the rotor 42 slides along the spline 38, thus positioning the rotor 42 in response to hydrodynamic forces between the stationary plates mounted on the support structure 51 and the stationary plates 64 mounted on the sliding head 68. A very small amount of tilting of the rotor with respect to the axis of the shaft 26 is also accommodated by the spline hub mount.

The sliding head 68 supports the door side stationery plates 64 on a support structure 80. This support structure allows stock to flow behind about thirty percent of the outer circumference of the support 80 which represents approximately fifty percent of the area of the refiner plate 64. Further, the stock which supports the outer thirty percent of the support 80 is at a higher pressure than the stock which flows through the shroud 46, due to the pumping action of the rotor 42. The hydraulic support of the support structure 80 thus supports the most highly loaded portion of the plate because the fluid pressure increases radially as the fluid is pumped by the rotor 42. The support structure 80 has minimal thermal gradients because the plate is either exposed directly to the stock or is remote from the exterior of the refiner 20. Thus deflections induced by thermal gradients are minimized.

The increased rigidity of the stationary plate mounting structures 51, 80 combined with the ability of the rotor 42 to align itself with the stationery plates 60, 64 results in greater uniformity of the gap between the rotating refiner plates 62, 64 mounted on the rotor 42 and the stationery plates 60, 64. The gap between the refiner plates typically is between two and four thousandths of a inch and is typically maintained and supported by the physical thickness of the pulp fibers as they pass between the refiner plates. Greater uniformity of this gap produces more uniform refining and reduced wear.

The refiner plates 60, 62, 64, 66 are typically segments which make up refining disks which, depending on the throughput of the refiner 20, may have a diameter of between sixteen and fifty-four inches. The refiner plates wear and must be periodically be replaced. Papermaking is a continuous process and if any given component of the process between wood chips and finished paper is out of commission for a significant length of time, the entire capital-intensive system may be brought to a halt. Thus simplicity and speed in maintenance is important. The refiner 20 is responsive to this need to minimize maintenance by employing stainless steel for the wetted components of the refiner to minimize corrosion, reducing periodic maintenance by reducing misalignment between refiner disks. Maintenance is further facilitated by a maintenance arm 82 shown in FIG. 3 which attaches to the hub 40 of the rotor 42 and removes the rotor from the refiner housing 34 where the plate segments 62, 64 can be unbolted and replaced.

The refining action produced by the refiner 20 is used in a wide variety of paper types, and thus processing capabilities of between 100 and 6,000 gallons per minute are desirable. These production flow rates correspond to power requirements of between 50 and 3,000 hp or approximately one-half hp per gallon per minute, although horsepower is also dependent on fiber content and fiber type. In fact the position of the sliding head 68 is controlled in response to motor torque to control energy input to the stock being processed by the refiner 20. By reducing the structural weight of the stationary plate supports, the overall weight of the refiner is reduced approximately fifteen to twenty percent.

It should be understood that although the refiner 20 is shown as a weldment, the various structural components could be castings. However weldments have the advantage of allowing a larger number of models to be offered, using cost effective modern computer driven laser or plasma cutting techniques.

It should be understood that maintenance of the refiner 20 is further facilitated by arranging the rotating assembly 24 as a discrete assembly which can be replaced as a unit. Moreover, the rotating assembly may use greased lubricated bearings or recirculating oil bearings which offer benefits where higher power motors are used.

Wherein a spline is disclosed and claimed it should be understood to include any non circular shaft cross-section which a complimentary opening in the rotor hub to allow the rotor to move along the shaft in response to motion of the sliding head 68, and accommodating such slight axial alignment as may be necessary for optimal positioning of the rotor with respect to stationary refining disks 60, 64. U.S. Pat. No. 4,783,014 to Fredriksson et al. discloses examples of such non circular shaft cross-sections, and is incorporated herein by reference.

It should be understood that tramp or junk refers to material such as metal nuts, bolts or other material which is not intended to be present in a stream of stock. Such materials can cause significant damage if they become lodged between refiner plates.

It should be understood that the removable packing box may be designed for standard breakage packing or alternately be a mechanical seal of the type known to those skilled in the shaft sealing art.

It is understood that the invention is not limited to the particular construction and arrangement of parts herein illustrated and described, but embraces such modified forms thereof as come within the scope of the following claims.

I claim:

1. A twin disk refiner comprising:

a housing having portions defining a stock inlet and portions defining a stock outlet, wherein flow of stock from the stock inlet to the stock outlet defines a downstream direction from the inlet to the outlet and defining an upstream direction from the outlet to the inlet;

a shaft which extends into the housing and which supports a rotor for rotation within the housing, and wherein a first rotating disk and a second rotating disk are mounted on the rotor so that the first rotating disk faces a direction opposite a direction faced by the second rotating disk;

portions of the housing which define a first plate support structure through which the shaft extends;

a first fixed refiner disk mounted to the first plate support structure;

a second fixed refiner disk mounted to a second plate support structure;

a refining chamber defined within the housing between, the first plate support structure and the second plate support structure, wherein the rotor is positioned within the refining chamber so that rotation of the rotor moves the first rotating disk and the second rotating disk about the shaft in refining relation to the first fixed refining disk and the second refining disk; and portions of the housing upstream of the refining chamber which define an upstream chamber in communication with the inlet, wherein the first plate support structure has an upstream face which is exposed to and substantially surrounded by the upstream chamber, such that fluid introduced into the housing at the inlet flows through the upstream chamber and then into the refining chamber, such that the first plate support structure is exposed to fluid pressure on its upstream face which counters the fluid pressure applied to the first fixed refiner disk within the refining chamber.

[2. The refiner of claim 1 wherein the stationary support structure forming part of the refiner housing is also part of the portion of the housing forming the circular flow path so that the stock substantially surrounds the stationary support structure.]

3. A disk refiner comprising:

a machine frame;

a shaft mounted for rotation on the machine frame and extending through a bulkhead into a refiner housing, a portion of the shaft extending into the refiner housing forming a spline;

a first non-rotating refiner disk mounted to a stationary support structure forming part of the refiner housing;

a second non-rotating refiner disk mounted on a sliding head in spaced parallel relation to the first non-rotating refiner disk for sliding motion towards the first non-rotating refiner disk;

a rotor having a central hub, the hub slidably mounting the rotor on the portion of the shaft forming the spline, the rotor supporting a third refiner disk in spaced parallel refining relation with the first refining disk, and a fourth refining disk in spaced parallel refining relation to the second refining disk, the shaft transmitting rotating motion through the spline to the rotor;

a stock inlet leading to a portion of the housing forming a circular flow path formed between an inner shell and an outer shell, the inner shell separating the circular flow path from the rotor, the circular flow path for inducing stock to rotate about the shaft, the stock inlet being positioned so that stock flowing from the inlet to the portion of the housing forming the circular flow path results in centrifugal acceleration moving heavy weight tramp towards the outer shell;

an outlet for heavy weight tramp located approximately at a lowermost portion of the outer shell;

a portion of the inner housing forming an opening through the inner shell so that rotational motion of stock is preserved as the stock flows towards the rotor.

4. A pulp disk refiner comprising:

a machine frame on which a shaft is mounted for rotation, the shaft having a first end and a second opposite end having portions forming a spline a refiner housing having a circular bulkhead wherein the second end of the shaft passes into the refiner housing through the circular bulkhead;

a rotor mounted to the spline;

portions of the refiner housing forming a stock inlet through which stock is supplied to a shroud, the shroud defining a passageway between an outer conical shell, an inner cylindrical structure and a drive side stationery plate support structure, the inner cylindrical structure surrounding the bulkhead, and wherein the shroud is arranged to cause the stock to rotate and thus produce an acceleration directed radially outwardly of the cylindrical structure;

a baffle terminating the passageway defined by the shroud;

portions of the inner cylindrical structure forming a plurality of holes in the inner cylindrical structure between the stock inlet and the baffle;

a reservoir formed on the inside of the cylindrical structure surrounding the shaft, the plurality of holes connecting the passageway to the reservoir so that stock flowing along the passageway between the outer conical shell and the inner cylindrical structure separates tramp metal and other heavy weight tramp;

a tramp outlet positioned near the lowermost portion of the shroud.

5. The refiner of claim 4 wherein a movable stationery plate is mounted on a sliding head, and wherein the sliding head is mounted for translation toward and away from the rotor, the sliding head being mounted by a bearing ring to a removable door which forms part of the refiner housing, the sliding head being balanced by a counterweight and driven by a mechanism which employs a variable frequency drive motor.

6. The refiner of claim 5 wherein sliding head supports the door side stationery plate on a support structure which allows stock to flow behind about thirty percent of the outer circumference of the support.

7. The refiner of claim 4 wherein the spline transmits rotary power to the rotor but is not affixed to the rotor, and wherein sufficient play between the rotor and the spline is provided so that the rotor slides along the spline, thus positioning the rotor in response to hydrodynamic forces between the stationary plate mounted on the support structure and the stationary plate mounted on the sliding head and wherein a very small amount of tilting of the rotor with respect to the axis of the shaft is thus accommodated by the spline hub mount.

8. The refiner of claim 4 wherein the passageway has a triangular cross-section.

9. The refiner of claim 4 wherein all portions of the refiner which come into contact with the stock are constructed of stainless steel.

*10. The refiner of claim 1 wherein the second plate support structure allows stock to flow behind the outer circumference of the second plate support structure.*

*11. The refiner of claim 10 wherein the second plate support structure allows stock to flow behind about thirty percent of the outer circumference of the second plate support structure.*

*12. The refiner of claim 3 wherein the stationary support structure forming part of the refiner housing is also part of the portion of the housing forming the circular flow path so that the stock substantially surrounds the stationary support structure.*

* * * * *